(12) United States Patent
Frey et al.

(10) Patent No.: US 11,382,275 B2
(45) Date of Patent: Jul. 12, 2022

(54) CONTINUOUS ROUND BALER ACCUMULATION CHAMBER

(71) Applicant: Tube-Line Manufacturing Ltd., Elmira (CA)

(72) Inventors: Oscar Frey, Listowel (CA); Orvie Knorr, Princeville (CA)

(73) Assignee: Tube-Line Manufacturing Limited, Elmira (CA)

( * ) Notice: Subject to any disclaimer, the term of this patent is extended or adjusted under 35 U.S.C. 154(b) by 807 days.

(21) Appl. No.: 16/329,097

(22) PCT Filed: Aug. 31, 2017

(86) PCT No.: PCT/CA2017/051031
§ 371 (c)(1),
(2) Date: Feb. 27, 2019

(87) PCT Pub. No.: WO2018/039801
PCT Pub. Date: Mar. 8, 2018

(65) Prior Publication Data
US 2019/0223384 A1    Jul. 25, 2019

(30) Foreign Application Priority Data

Aug. 31, 2016  (GB) .................................... 1614767
Feb. 8, 2017   (GB) .................................... 1702063
Feb. 8, 2017   (GB) .................................... 1702065

(51) Int. Cl.
*A01F 15/07*    (2006.01)
*A01F 15/10*    (2006.01)
*A01F 15/08*    (2006.01)

(52) U.S. Cl.
CPC ...... *A01F 15/0705* (2013.01); *A01F 15/0825* (2013.01); *A01F 15/0833* (2013.01); *A01F 15/10* (2013.01); *A01F 15/106* (2013.01)

(58) Field of Classification Search
CPC . A01D 89/006; A01D 89/008; A01F 15/0705; A01F 15/0825; A01F 15/0833; A01F 15/10; A01F 15/106
See application file for complete search history.

(56) References Cited

U.S. PATENT DOCUMENTS 2,909,989 A   10/1959  Bornzin
3,203,523 A    8/1965  Gilder et al.
(Continued)

FOREIGN PATENT DOCUMENTS

CA      1094385 A      1/1981
DE    26 34 638 A1     2/1978
(Continued)

OTHER PUBLICATIONS

International Search Report and Written Opinion of the International Searching Authority for International Patent Application No. PCT/CA2017/051031 dated Dec. 19, 2017, 8 pages.

*Primary Examiner* — Adam J Behrens
(74) *Attorney, Agent, or Firm* — Bereskin & Parr LLP

(57) ABSTRACT

An apparatus for continuously forming round bales of forage material, and particularly round bales with compressed side walls, from windrowed harvested lines of forage, the apparatus including a continuous pickup, a continuous rotary chopper, an accumulation chamber with a compressed and chopped forage material entry slot and a decompressing exit slot plus a standard form intermittent round baler.

17 Claims, 11 Drawing Sheets

(56) References Cited

U.S. PATENT DOCUMENTS

| | | | |
|---|---|---|---|
| 4,062,172 A | 12/1977 | Rice et al. | |
| 4,238,917 A | 12/1980 | Oosterling et al. | |
| 4,468,206 A | 8/1984 | Herchenbach et al. | |
| 4,499,714 A | 2/1985 | Hollmann | |
| 4,510,861 A * | 4/1985 | Campbell | A01F 15/0705 100/88 |
| 4,534,285 A * | 8/1985 | Underhill | A01F 15/0705 100/88 |
| 4,563,854 A | 1/1986 | Ackermann et al. | |
| 4,563,868 A | 1/1986 | Clostermeyer | |
| 4,566,380 A | 1/1986 | Clostermeyer et al. | |
| 4,569,439 A | 2/1986 | Freye et al. | |
| 4,580,398 A | 4/1986 | Bruer et al. | |
| 4,597,241 A | 7/1986 | Clostermeyer | |
| 4,597,248 A | 7/1986 | Campbell et al. | |
| 4,599,844 A | 7/1986 | Clostermeyer et al. | |
| 4,604,848 A | 8/1986 | Clostermeyer et al. | |
| 4,635,543 A | 1/1987 | Clostermeyer et al. | |
| 4,656,812 A | 4/1987 | Busse et al. | |
| 4,703,605 A | 11/1987 | Ackermann | |
| 4,803,832 A | 2/1989 | Crawford | |
| 4,914,900 A | 4/1990 | Viaud | |
| 5,115,734 A | 5/1992 | Quartaert | |
| 5,134,839 A | 8/1992 | Clostermeyer et al. | |
| 5,136,831 A | 8/1992 | Fell et al. | |
| 5,255,501 A * | 10/1993 | McWilliams | A01F 15/106 100/88 |
| 5,479,766 A | 1/1996 | Ransom | |
| 5,848,523 A | 12/1998 | Engel et al. | |
| 6,029,434 A | 2/2000 | Ratzlaff et al. | |
| 6,032,446 A | 3/2000 | Gola et al. | |
| 6,263,650 B1 | 7/2001 | Deutsch et al. | |
| 6,279,304 B1 | 8/2001 | Anstey et al. | |
| 6,467,237 B2 | 10/2002 | Viaud | |
| 6,601,375 B1 | 8/2003 | Grahl et al. | |
| 6,948,300 B1 | 9/2005 | Bandstra et al. | |
| 7,181,900 B2 | 2/2007 | Hood et al. | |
| 7,204,074 B2 | 4/2007 | Banstra et al. | |
| 7,395,756 B2 | 7/2008 | Meinders | |
| 7,818,954 B2 * | 10/2010 | Rempe | A01F 15/106 56/341 |
| 8,156,723 B1 | 4/2012 | McClure et al. | |
| 8,225,713 B2 | 7/2012 | Horstmann et al. | |
| 8,240,117 B1 | 8/2012 | McClure et al. | |
| 8,413,414 B2 | 4/2013 | Herron et al. | |
| 8,627,765 B2 * | 1/2014 | Reijersen Van Buuren | A01F 15/0705 100/88 |
| 8,833,247 B2 * | 9/2014 | Olander | A01F 15/07 100/88 |
| 8,869,688 B2 | 10/2014 | Bruening | |
| 8,910,460 B2 * | 12/2014 | Horstmann | A01F 15/0715 100/88 |
| 9,055,716 B2 | 6/2015 | Roberge | |
| 9,084,394 B2 * | 7/2015 | Roberge | A01F 15/10 |
| 9,101,089 B2 | 8/2015 | Horstmann | |
| 9,253,948 B2 | 2/2016 | Olander et al. | |
| 9,258,946 B2 * | 2/2016 | Olander | A01F 15/0705 |
| 9,277,692 B2 | 3/2016 | Roth | |
| 9,345,196 B1 | 5/2016 | Weber | |
| 9,386,750 B2 | 7/2016 | Verhaeghe et al. | |
| 9,396,153 B2 | 7/2016 | Peters et al. | |
| 9,402,346 B2 | 8/2016 | Bonte et al. | |
| 9,402,349 B2 | 8/2016 | Chaney | |
| 9,420,746 B2 | 8/2016 | Gresset et al. | |
| 9,439,358 B2 | 9/2016 | De Rycke et al. | |
| 9,462,753 B2 * | 10/2016 | Oakes | A01F 15/0705 |
| 9,468,149 B2 | 10/2016 | Derscheid et al. | |
| 9,474,206 B2 | 10/2016 | Garton et al. | |
| 9,474,212 B2 | 10/2016 | Paillet et al. | |
| 9,485,910 B2 | 11/2016 | Lebeau et al. | |
| 9,485,916 B2 | 11/2016 | Lang | |
| 9,494,538 B2 | 11/2016 | Kozicki et al. | |
| 9,510,511 B2 | 12/2016 | Goering et al. | |
| 9,521,805 B2 | 12/2016 | Muench et al. | |
| 9,526,212 B2 | 12/2016 | Smith et al. | |
| 9,528,576 B2 | 12/2016 | Anstey et al. | |
| 9,578,811 B2 | 2/2017 | Kraus et al. | |
| 9,585,311 B2 | 3/2017 | Kraus et al. | |
| 9,599,163 B2 | 3/2017 | Derscheid | |
| 9,600,872 B2 | 3/2017 | Dima | |
| 9,603,308 B2 | 3/2017 | Roberge | |
| 9,622,408 B1 | 4/2017 | Miller et al. | |
| 9,622,420 B2 | 4/2017 | Kraus et al. | |
| 9,635,814 B2 | 5/2017 | Kraus | |
| 9,642,311 B2 | 5/2017 | Posselius et al. | |
| 9,706,700 B2 | 7/2017 | Lammerant et al. | |
| 9,730,391 B2 | 8/2017 | Bonte et al. | |
| 9,877,432 B2 * | 1/2018 | Smith | A01F 15/106 |
| 9,894,843 B2 | 2/2018 | Smith | |
| 9,949,438 B2 | 4/2018 | Smith | |
| 9,949,441 B2 * | 4/2018 | Olander | A01F 15/10 |
| 2002/0095925 A1 | 7/2002 | Preheim | |
| 2004/0011016 A1 | 1/2004 | McClure et al. | |
| 2005/0086921 A1 | 4/2005 | Bares et al. | |
| 2008/0163600 A1 | 7/2008 | Schrag et al. | |
| 2008/0271428 A1 * | 11/2008 | Rempe | A01F 15/106 56/341 |
| 2009/0017885 A1 | 1/2009 | Halls | |
| 2011/0023441 A1 | 2/2011 | Herron et al. | |
| 2011/0023442 A1 | 2/2011 | Herron et al. | |
| 2012/0096827 A1 | 4/2012 | Chaney et al. | |
| 2012/0159918 A1 | 6/2012 | McClure et al. | |
| 2012/0204734 A1 * | 8/2012 | Reijersen Van Buuren | A01F 15/0705 100/88 |
| 2012/0222565 A1 | 9/2012 | Herron et al. | |
| 2012/0234651 A1 | 9/2012 | Herron et al. | |
| 2012/0297992 A1 * | 11/2012 | Oakes | A01F 15/106 100/70 R |
| 2012/0304612 A1 | 12/2012 | Roberge | |
| 2013/0036921 A1 * | 2/2013 | Horstmann | A01D 37/00 100/40 |
| 2014/0144119 A1 * | 5/2014 | Olander | A01F 15/0705 56/341 |
| 2014/0157748 A1 * | 6/2014 | Olander | A01F 15/0705 198/510.1 |
| 2014/0165865 A1 | 6/2014 | Chover et al. | |
| 2014/0237981 A1 * | 8/2014 | Roberge | A01F 15/0705 198/572 |
| 2014/0373737 A1 | 12/2014 | Olander et al. | |
| 2015/0201561 A1 * | 7/2015 | Oakes | A01F 15/106 100/207 |
| 2016/0088799 A1 | 3/2016 | Demon et al. | |
| 2016/0113206 A1 | 4/2016 | Kraus | |
| 2016/0120093 A1 | 5/2016 | Garton et al. | |
| 2016/0120126 A1 * | 5/2016 | Weber | A01D 46/084 56/16.4 B |
| 2016/0120128 A1 | 5/2016 | Guerin | |
| 2016/0128280 A1 | 5/2016 | Demulder et al. | |
| 2016/0135374 A1 | 5/2016 | Roth | |
| 2016/0135375 A1 | 5/2016 | Smith | |
| 2016/0137372 A1 | 5/2016 | Anstey et al. | |
| 2016/0150735 A9 | 6/2016 | Gresset et al. | |
| 2016/0219789 A1 | 8/2016 | Derscheid et al. | |
| 2016/0273588 A1 | 9/2016 | Derscheid | |
| 2016/0302359 A1 | 10/2016 | Goering et al. | |
| 2016/0305514 A1 | 10/2016 | Anstey et al. | |
| 2016/0308954 A1 | 10/2016 | Wilbur et al. | |
| 2016/0353664 A1 | 12/2016 | Weber et al. | |
| 2016/0353665 A1 | 12/2016 | Hummel et al. | |
| 2016/0355292 A1 | 12/2016 | Wigdahl et al. | |
| 2016/0366830 A1 | 12/2016 | Menetrier et al. | |
| 2016/0366831 A1 | 12/2016 | Chapon et al. | |
| 2016/0366832 A1 | 12/2016 | Kraus et al. | |
| 2016/0374269 A1 | 12/2016 | Jones et al. | |
| 2016/0374271 A1 | 12/2016 | Menetrier et al. | |
| 2016/0374272 A1 | 12/2016 | Pourchet et al. | |
| 2017/0000035 A1 | 1/2017 | Behrens et al. | |
| 2017/0013772 A1 | 1/2017 | Kirk et al. | |
| 2017/0013783 A1 | 1/2017 | Kirk et al. | |
| 2017/0016518 A1 | 1/2017 | Anstey et al. | |

(56) References Cited

U.S. PATENT DOCUMENTS

| | | |
|---|---|---|
| 2017/0020063 A1 | 1/2017 | Guiet et al. |
| 2017/0020076 A1 | 1/2017 | Dutertre |
| 2017/0037897 A1 | 2/2017 | Anstey et al. |
| 2017/0041407 A1 | 2/2017 | Wilbur et al. |
| 2017/0042091 A1 | 2/2017 | Goering |
| 2017/0042093 A1 | 2/2017 | Chapon et al. |
| 2017/0049058 A1 | 2/2017 | Eubanks et al. |
| 2017/0050691 A1 | 2/2017 | Guerin et al. |
| 2017/0075354 A1 | 3/2017 | Putkonen et al. |
| 2017/0086381 A1 | 3/2017 | Roell et al. |
| 2017/0089363 A1 | 3/2017 | Jones et al. |
| 2017/0094894 A1 | 4/2017 | Heim et al. |
| 2017/0105352 A1 | 4/2017 | Rosseel et al. |
| 2017/0112054 A1 | 4/2017 | Miller et al. |
| 2017/0112060 A1* | 4/2017 | Noonan ............ A01D 69/03 |
| 2017/0112066 A1 | 4/2017 | Pohlmann et al. |
| 2017/0112069 A1 | 4/2017 | Kraus et al. |
| 2017/0112070 A1 | 4/2017 | Kraus et al. |
| 2017/0118918 A1 | 5/2017 | Chaney et al. |
| 2017/0202149 A1 | 7/2017 | Smith |
| 2017/0202150 A1 | 7/2017 | Smith |
| 2017/0202151 A1 | 7/2017 | Smith |

FOREIGN PATENT DOCUMENTS

| | | |
|---|---|---|
| DE | 34 31 389 A1 | 2/1986 |
| DE | 41 02 034 A1 | 7/1992 |
| DE | 195 46 263 A1 | 6/1997 |
| DE | 297 11 213 U1 | 8/1997 |
| DE | 199 32 336 A1 | 1/2001 |
| DE | 100 06 384 A1 | 8/2001 |
| EP | 0 350 514 A1 | 1/1990 |
| EP | 1 982 575 A1 | 10/2008 |
| EP | 2 556 742 A1 | 2/2013 |
| EP | 2 664 230 A1 | 11/2013 |
| EP | 2 769 614 A1 | 8/2014 |
| EP | 2 556 741 B1 | 8/2017 |
| FR | 2 402 398 A1 | 4/1979 |
| FR | 2 571 211 A1 | 4/1986 |
| GB | 2 003 716 A | 3/1979 |
| GB | 2 146 947 A | 5/1985 |
| NZ | 226556 A | 4/1991 |
| WO | 2011/012960 A2 | 2/2011 |
| WO | 2018/039801 A1 | 3/2018 |

* cited by examiner

CONTINUOUS ROUND BALER ACCUMULATION CHAMBER

This application is a National Stage Application of PCT/CA2017/051031, filed 31 Aug. 2017, which claims benefit of Application Serial No. 1614767.0, filed 31 Aug. 2016 in the United Kingdom, Application Serial No. 1702063.7, filed 8 Feb. 2017 in the United Kingdom and Application Serial No. 1702065.2, filed 8 Feb. 2017 and which applications are incorporated herein by reference. To the extent appropriate, a claim of priority is made to each of the above disclosed applications.

This application claims priority from a British provisional application, GB-1614767.0, filed Aug. 31, 2016, a British provisional application GB-1702063.7, filed Feb. 8, 2017, and a British provisional application, GB-1702065.2, filed Feb. 8, 2017.

FIELD OF THE INVENTION

In this application forage and forage material include all manner of harvested agricultural crops and forage feeds, provisions and agricultural remainders including straw, hay, grasses, corn stalks, and the like suitable for baling.

The field of the invention relates to agricultural baling of harvested and windrow forage material and particularly to the formation of round bales.

PRIOR ART

It has long been the objective to provide an effective method and apparatus by which large round bales (LRB) of straw and forage material may be continuously formed as windrowed crops are picked up from the field. Even more so an objective would be to carry out the formation of a highly regular LRB, referred to as a SRB or square round bales, with a single machine capable of operating continuously and quickly in a wide variety of operating conditions with a wide variety of crop types, crop conditions, windrowed location and density, with limited or no plugging or work stoppage. A desirable LRB result is provided by a continuous stream of identical bales, each with a predicted uniform density and shape, particularly ones with compacted and planar side surfaces, the ideal SRB. Ideal SRBs are simpler, safer and more economical to transport at all stages of organization, loading, traveling and unloading.

In baler machines known to the applicant intensive driver techniques are required to ensure lateral or side-to-side uniformity of the output bale. These may be carried out manually with considerable attention and skill or semi-automatically with the use of bale loading sensors.

The typical windrow is not a uniform strip of harvested material always lying on a flat and featureless farm field. The windrow may wander laterally from side to side even in the flatest of circumstances, its direction of travel, size and density will certainly vary from nearly zero material to lumps and density gradients which require significant slow down of even the largest balers during the baling cycle. These irregularities, unless attended to well, are delivered directly into the baler pressure cavity where they impact upon the real world requirement uniformity of the finished bales. For instance, poorly formed bales may have unsuitable densities or form causing a direct impact on all downstream operations and product values. In a severe case bales cannot be stacked enough for efficient long distance transport thereby raising a significant safety issue, especially with underskilled drivers and operators as a single bale may weigh as much as a ton.

A problem occurs when well-known LRB technology, whether directed at soft or hard core bales, is sought to be incorporated into a method and apparatus whereby the bale formation process is continuous in that it is neither required to slow down or stop the pulling tractor during the farming operation.

An early attempt for an improved baling method is shown in German patent . . . 638 issued Oct. 15, 1987 to Glaas (herein Glaas). FIG. 1 shows a rotary pickup operating to lift the windrow from a flat field surface and deliver it horizontally on to a rearward motion conveyor belt. The conveyor belt transports a corresponding belt of crop material rearward in to the mouth of a hard core baler structure (FIG. 1). Pre-input, the crop material is compressed both over the main transport belt and more aggressively by an gating conveyor before it is delivered to the pressing chamber input.

As shown in (Glaas) FIG. 2 when the baling operation is complete the gating conveyor is reversed and input material piles up in the form of a compressed slug of forage against the rearward gating conveyor and the compression belt itself.

Once the press chamber is empty and another baling duty cycle commences the gating conveyor is engaged and the compressed slug of forage is forced into the press chamber input.

FIGS. 3 through 5 of Glaas show a somewhat similar operation with a soft core bale chamber.

In 2001 Lely published patent German patent DE 199, 32,336 which shows an attempt to overcome materials feeding issues when adapting a soft core baler to continuous operation. In FIG. 1 the forage material is picked up from the field and then chopped into finer lengths by a chopper [336-25]. The chopped material is then ejected from the chopper by cleaner blades [336-24] so as to fill the pre-chamber [336-27] from the bottom along the bottom conveyor. Material flows from the chopper along the surface of the conveyor belt [336-28] from front to rear of the machine opposite direction [336-20]. Lely adds a press chamber $2^{nd}$ rotor [336-14] to drive the forage into the press chamber during the baling duty cycle. Varying materials are accommodated by a rear roller [336-33] which floats up and down to accommodate the differing duty cycles and differing materials.

The dual floating throat of the press chamber input is required as the forage accumulated during the non-baling duty cycle is driven from front to back along the lower conveyor and presents a compressed slug of material to the input rotor pair. The input rotor plus operates to expand to accommodate and drive the slug into the press chamber in a compressed or slug fashion. This is in accordance with the teachings of the art at the time, as known to the applicant, which directed delivery of this pre-compressed slug into the press chamber volume.

Thus, during the non-baling portion of the duty cycle forage material is driven to the rear so as to be restrained by compression against the baler itself.

In 2008 another company operating as Pottinger published European patent 1,982,575 for a combination of a self-loading hay wagon and a soft core baler carried in the body of the wagon itself, see FIG. 2. In this paragraph numbering refers to the EU'575 patent. A floor conveyor 575-14 is started and stopped in the fashion of Lely and DE 336 and bumped along against the Lely wagon rear door.

Upper toothed rotor drives the forage to the rear when in the baling cycle in conjunction with floating floor conveyor 575-14. Again, as a soft core baler, the EU'575 drawings depict the development of a slug of material accumulated during the non-baling duty cycle which is bumped and transported to the rear and restrained horizontally the beater bars 18. In the bailing duty cycle operation of the beater bars 18 provide a waterfall effect of forage material falling upon any material being transported between rotor 18 and belt 14. For continuous input forage material is picked up as at rotary pickup 9 and chopped by slow rotating rotor 11 so as to be delivered into the accumulation chamber 2 and largely horizontally or parallel to conveyor surface 15.

OBJECTS OF THE INVENTION

It is an objection of the invention to provide a continuous round baler (continuous round baler) capable of operating in a wide variety of conditions and forage materials which is simple and inexpensive to manufacture.

It is a further object of the invention to provide a continuous round baler which uses fewer and less expensive mechanical parts so as to enhance reliability and repairability in actual field conditions.

It is a still further object of the invention to provide a continuous round baler which avoids the use of an input slug at the beginning of each baler duty cycle, especially with soft core balers, and avoids non-rotary components.

It is a still further object to provide a method of continuously operating a forage baler which produces a square round bale while reducing machine operator input arising from non-linear and/or non-uniform windrows of harvested forage.

STATEMENT OF THE INVENTION

The invention provides a method of continuously forming large round bales of forage including:
(a) providing a continuously operating round baler including a baling chamber having a bale forming duty cycle and a wrapping/ejection duty cycle,
(b) continuously picking up a windrow of forage material with a transverse rotary rake mounted to the baler during both the bale forming duty cycle and the wrapping/ejection duty cycle,
(c) providing an accumulation chamber forward of the baling chamber sized to contain and retain material picked up during the wrapping/ejection cycle, having side walls, a forward wall and a rearward wall plus an active floor including a down-sloped floor conveyor, adapted to advance accumulated forage material to the rear towards the baler during the baling duty cycle,
(d) continuously feeding the picked up forage material into a transverse rotary chopper having a transverse letterbox output orifice adjacent the bottom of the chamber,
(e) continuously chopping the forage material and continuously driving it through the rotary chopper output orifice under back pressure,
(f) ejecting the chopped forage material from the output orifice upwards into the accumulation chamber under gravitational back pressure to form a retained body of chopped forage material in the chamber,
(g) the back pressure providing an upwardly directed roiling of the chopped forage material in the retained body,
(h) tumbling the roiling chopped forage material laterally and to the rear,
(i) maintaining the bulk of chopped material in the retained body forward in the chamber,
(j) activating the floor conveyor throughout the bale forming duty cycle and moving the chopped forage material rearward on the floor conveyor toward the rearward wall and solely through a transverse letterbox chamber exit slot between the conveyor and a transverse upper rotary rake driven in conjunction with the floor conveyor,
(k) providing rearward differential throughput speeds as between the surface of the floor conveyor and the throughput speed of the rotary rake,
(l) raking all of the chopped forage material through the letterbox chamber exit slot between the rotary rake and the floor conveyor and ejecting it decompressed onto a downstream conveying surface, and,
(m) delivering the decompressed chopped material on the downstream conveying surface to a baler input for bale forming during the baling duty cycle.

The invention also provides a method of continuously operating a round baler device though multiple duty cycles while an chamber accumulates chopped forage material during each wrapping/ejection duty cycle and discharges the retained body at the end of each baling duty cycle.

The invention also provides a method of continuously operating a round baler device by providing an accumulator with letterbox exits extending across the width of the floor conveyor which confine the forage material driven in to the accumulator and driven out during the baling cycle with or without flow edge-in narrowing and widening of the flow to produce a square round bale.

The invention also provides a method of continuously operating a round baler device by providing an accumulator wherein the floor conveyor has no rearward motion during the wrapping/ejection cycle and delivery to the baler is stopped.

The invention also provides a method of continuously operating a round baler device by providing an accumulator wherein downward raking of the retained body of chopped forage material adjacent the rear wall of the chamber towards the rotary rake drives the chopped forage through the chamber exit slot only during the baling cycle.

The invention also provides a method of continuously operating a round baler device by providing an accumulator wherein differential throughput speeds are provided by one or more rotary rakes operating at a higher throughput speed than the speed of the surface of the conveyor.

The invention also provides a continuous round forage baler including:
(n) an baling duty cycle,
(o) a wrapping/ejection duty cycle,
(p) a continuously operating transverse rotary pickup,
(q) a continuously operating rotary chopper structured to provide a continuous stream in chopped compressed forage into an accumulation chamber,
(r) an accumulation chamber including opposed side walls, a rearward wall and an down-sloped active floor structured to contain the continuous stream of chopped forage and retain the input stream during both the baling and the wrapping/ejection cycle,
(s) a transverse chopper exit slot between the chopper and the chamber bottom structured to deliver a continuous input stream of compressed chopped forage upward into the forward portion of the accumulation chamber against a back pressure, (t) a transverse rotary rake adjacent the rear wall of the accumulation chamber, (u) a single transverse exit slot between the floor conveyor and the transverse rotary rake, (v) a rotary drive structured to drive the live floor and the rotary rate together during the baling duty cycle at a differential speed between the surface speed of the floor conveyor and the throughput speed of the rotary rake, (w) a downstream conveying surface structured to support raked and decompressed forage material in transport from said exit slot rearward to a baler.

DRAWINGS

PREFERRED EMBODIMENTS

Figure 1:
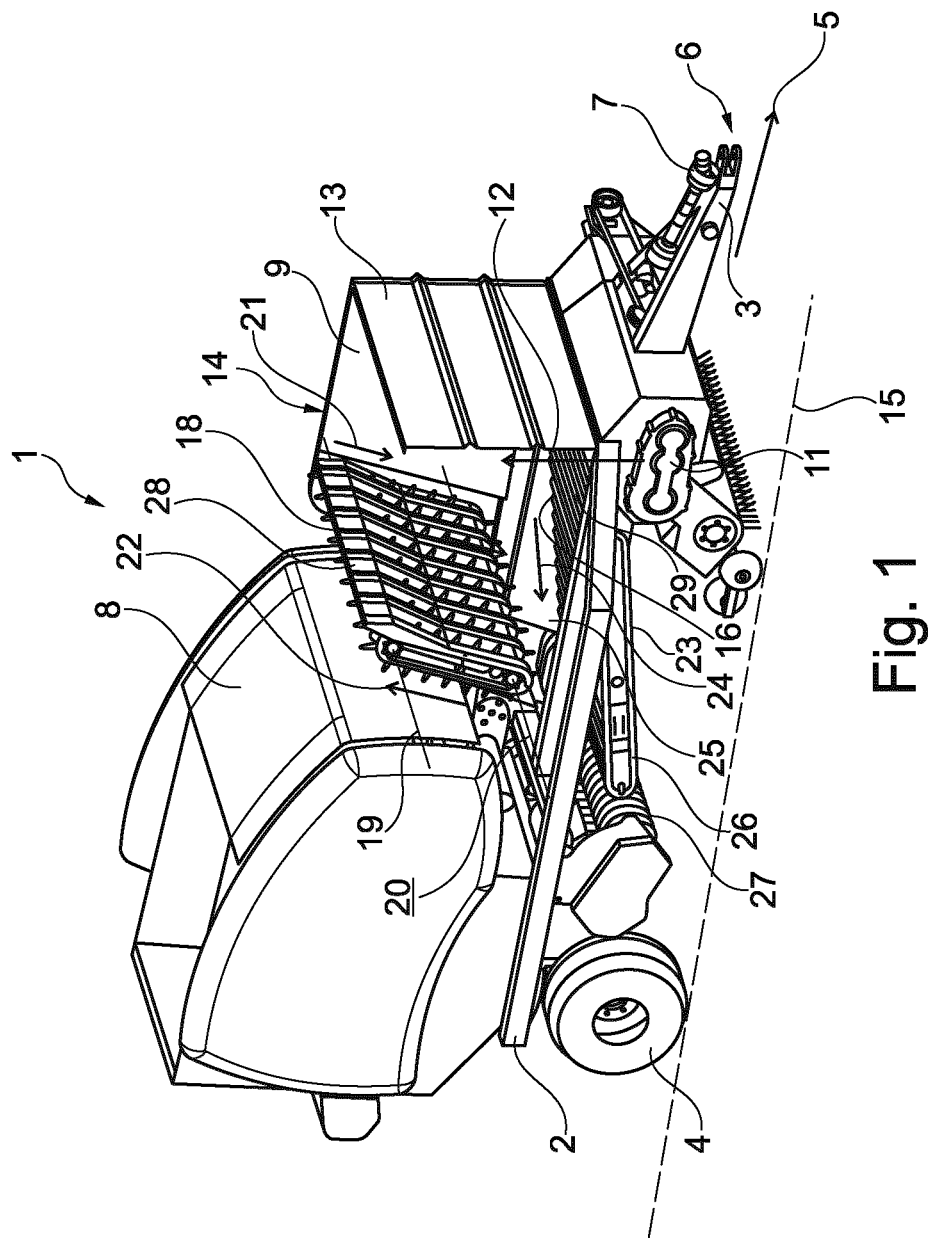
FIG. 1 is a perspective view of the continuous round baler of the invention with a portion of the forward and rearward wall not shown for ease of reference to the interior of the accumulator.

Preferred embodiments of the continuous round baler 1 of the invention are shown in the drawings.

The macro components of the continuous round baler 1 include a frame 2 supported upon wheels 4 and a drawbar 3 upon a field level 15 for operable connection to a tractor (not shown), as at 6, for continuous travel in the forward direction 5. Power for operation of the continuous round baler 1 is preferably provided from the tractor to a main continuous round baler drive 7 by means of a standard tractor PTO.

Round bales of forage material are formed about a transverse winding axis within a winding chamber in round baler 8, of well-known construction which may be either soft core or hard core, but preferably hard core. Once complete formed bales are then ejected from the winding chamber, tied or wrapped in a compressed state and dispatched from the winding chamber to the rear. As is well-known with balers, the operative duty cycle is intermittently changed back and forth between a baling or winding duty cycle wherein the baler chamber is provided with a supply of input forage to a wrapping/ejection duty cycle when input of forage to the baler chamber is stopped.

With the continuous round baler 1 of the invention, the frame 2 also supports:

an accumulation chamber, accumulator 9, mounted forward of the baler 8, a transverse rotary pickup 10 adapted to continuously pick up a windrow of harvested forage material from the field surface, while the continuous round baler 1 is moved in the direction of travel 5, and a transverse rotary chopper 11 continuously is operable in conjunction with the pickup 10 to chop the harvested forage in a pre-determined pattern by a transverse array of rotary knives and opposing teeth.

Most preferably pickup 10 and chopper 11 are continuously driven directly by continuous round baler main drive 7 at a high speed sufficient, such as 300 rpm for a throughput speed set by a tip speed of 20,000 inches per minute, to ensure that in most field and crop conditions the volume of forage picked up and chopped lies within the maximum throughput speeds of each of the pickup 10 and the chopper 11. Since the PTO speed is nominally a constant rpm of either 540 rpm or 1,000 rpm, the input volume may be controlled in a known manner by adjusting the forward speed of the continuous round baler 1 along the direction of travel.

In accordance with the invention, forage output from the chopper 11 is rendered more fluid and is continuously driven upward under compression, as at direction 12, into the accumulator chamber 9 from the chopper 11 through a transversely extending chopper exit slot 52. Upward driving force provided by chopper 11 and compression provide a gravitational back pressure 53 in exit slot 52. Preferably chopper exit slot 52 is in the shape of a horizontal letterbox and extends the full width of conveyor 16. In chamber 9 the input material retained loading remains largely in motion as it is laterally confined by a transverse forward wall 13, a pair of side walls 14 oriented in the direction of travel 5, only 1 of which is shown in FIG. 1, and a rearward wall 17 not shown in FIG. 1, and supported upon a live conveying floor 16. In the embodiment shown in FIG. 1 the upper boundary of the accumulator may be open as shown in FIG. 1 or closed.

Accumulator 9 includes an upper conveyor 18 adjacent or forming the rearward wall 17. Preferably upper conveyor 18 is planar and extends the full accumulator width between side walls 14 and carries an array of driving teeth 27. Upper conveyor is intermittently operably driven downwards as at direction 21 between 2 transverse axles or axes 19 (upper) and 20 (lower) in conjunction with live floor conveyor 16 during the baling duty cycle to drive chopped forage material downwards in direction 21 while it is transported and driven rearwards on live floor 16. Most preferably, upper axle 19 is mounted forward of lower axle 20 to cant toothed conveyor 18 forward of vertical in the direction of travel 5, with its idler surface to the rear for return motion upward as at direction 22.

Live floor 16 includes a conveyor 23, which preferably extends the full accumulator width between side walls 14, intermittently operably driven in conjunction with toothed conveyor 18 to both carry/transport and to drive forage material in accumulation chamber 9 downwards and to the rear along direction 24.

As shown in FIG. 1, live floor conveyor 16 extends rearward of the lowermost point of toothed conveyor 18, as at 26, to form a transverse chamber exit slot 25 extending the full width of the live floor 16, most preferably at the lowermost point of accumulator chamber 9 as shown in FIG. 1.

During the baling duty cycle foraged chopped material is raked from the retained moving body into an uncompressed and uniformly distributed state as it is driven between the live floor conveyor 16 and the toothed array 27 of upper conveyor 18 through exit slot 25 and thence transported rearwards of exit slot 25. Exit slot is elongated across the full width of the conveyor 16 in the shape of a vertically oriented letterbox. Downstream delivery of decompressed material 25 is supported on extension 26 of live floor 16 to the baler input as a uniform (both transversely of and in the direct of travel) belt of baler input forage, preferably unconstrained vertically as shown in FIG. 1. Alternatively, as shown in FIG. 1, the rearward flow of foraged material may continued beyond live floor conveyor 16 extension 26 by a further transverse rotary transport such as the toothed drive 27 shown in FIG. 1.

Most preferably, upper conveyor 18 and rear wall 19 may be operatively combined in to an downwardly active apron 28 wherein the toothed array protrudes beyond the wall to drive forage material downwards.

Figure 2:
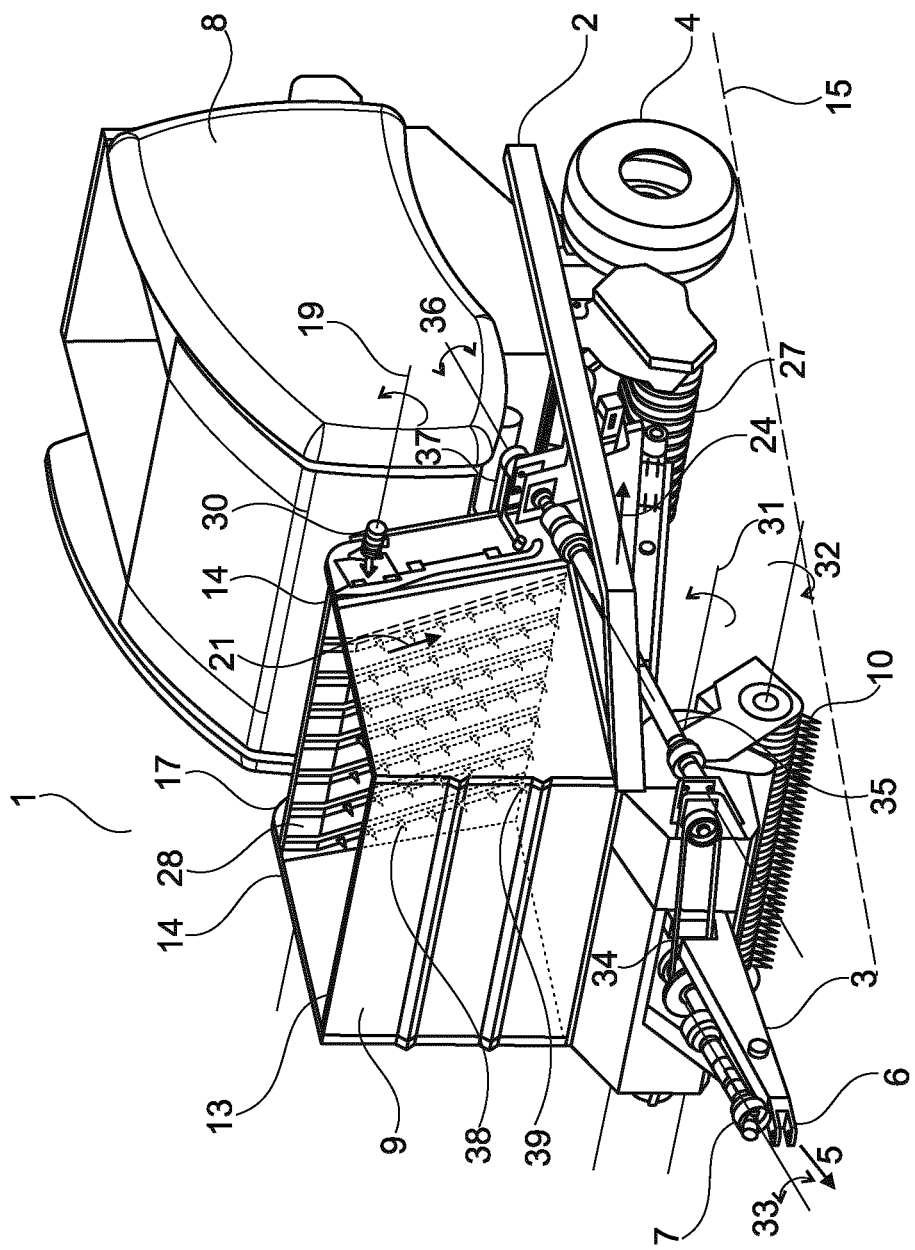
FIG. 2 is a further perspective view of the continuous round baler of FIG. 1 from the opposite side.

In FIG. 2 downward direction 21 of the planar toothed conveyor 18 is provided by a hydraulically driven axle as at 20 driven during the baling duty cycle in conjunction with live floor 16 for rotation counter-clockwise (in FIG. 2) about axle 19. Alternate axle 20 or both preferably toothed array 27 is driven downward in direction 21 during the baling duty cycle and around the bottom edge of active apron 28 while fully exposed to the chopped forage within accumulator 9 as at 39 in FIG. 2. Forage is raked from the accumulator downstream from the exit slot.

Pickup 10 is driven for rotation clockwise about axis 32 to pick up as, by raking, loose windrowed forage material from the field and directing the flow into the rotary chopper 11 below accumulator 9 which is continuously rotating counterclockwise about axis 31.

Mechanical power is provided by the tractor PTO by hydraulically driving drive 7 in rotation about axis 33. Preferably power is then transferred laterally around accumulator 9 by drive belt 34 which in turn drives side-axle 35 in rotation about front to back axis 36. Power is then laterally transferred again back into a center line for baler input by rear drive belt 37.

Planar toothed array 38 is driven by rotating upper conveyor 18 to drivingly carry toothed array 38 downward and preferably rearwardly and thence in a transverse line of advancing teeth 39 which rake forage material through the exit slot 25 during the baling duty cycle.

Figure 3:
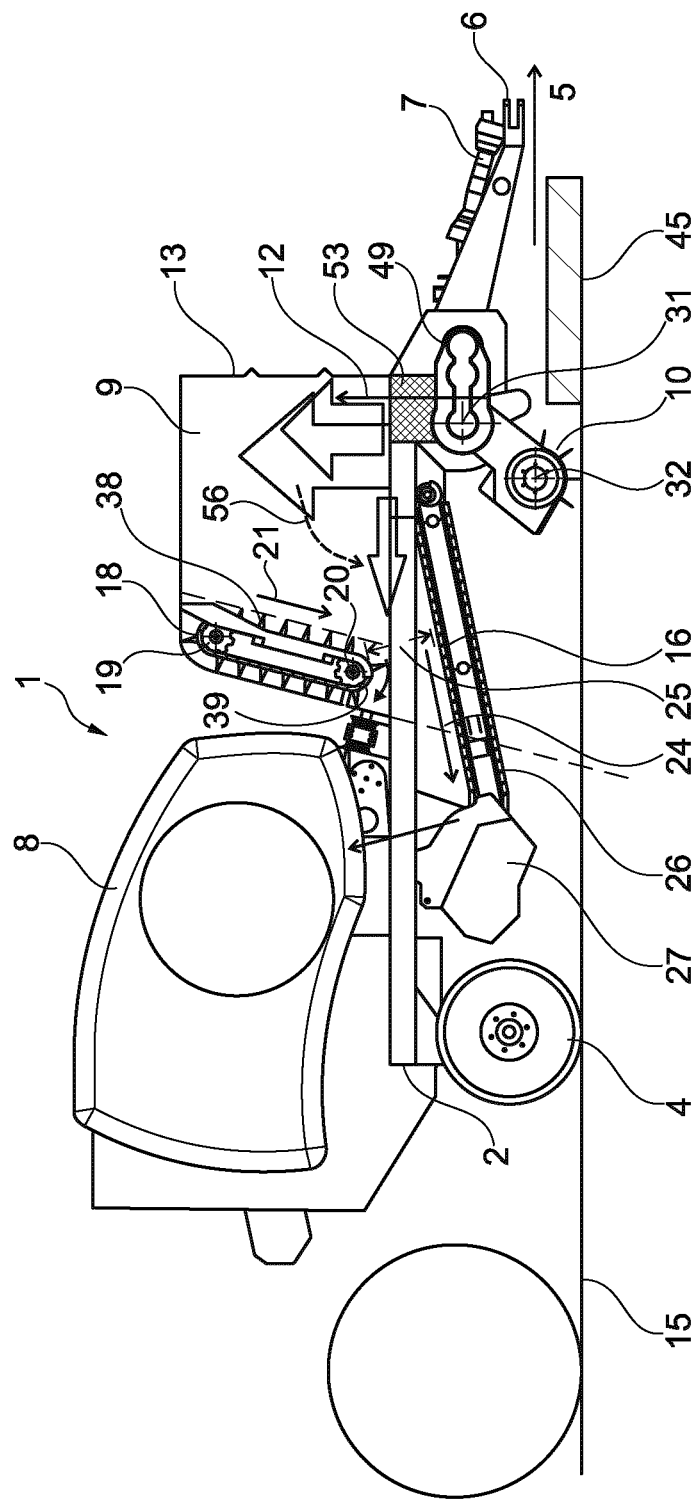
FIG. 3 is a starboard side elevation of the continuous round baler of FIG. 1 indicating forage flow.

FIG. 3 is a side elevation of FIG. 1 showing forage material flow. Windrowed forage material 45 is laid out in long field rows which are aligned with the forward direction of travel 5, more or less. Forage 45 is continuously picked up by the rotating tynes 10 of transverse input rake 32 rotating counter-clockwise as depicted in FIG. 3 and thence continuously through transverse rotary chopper 49 to be delivered upwardly continuously into accumulator 9 in a chopped and compressed state 53 as driven upwards against, preferably, gravity, in a, preferably, upwards direction 12.

Rotary chopper may be operated in a range of about 300 rpm with multiple blades across the transverse input width and multiple drive teeth per blade for a tip speed in the range of up to about 20,000 inches per minute.

Figure 4:
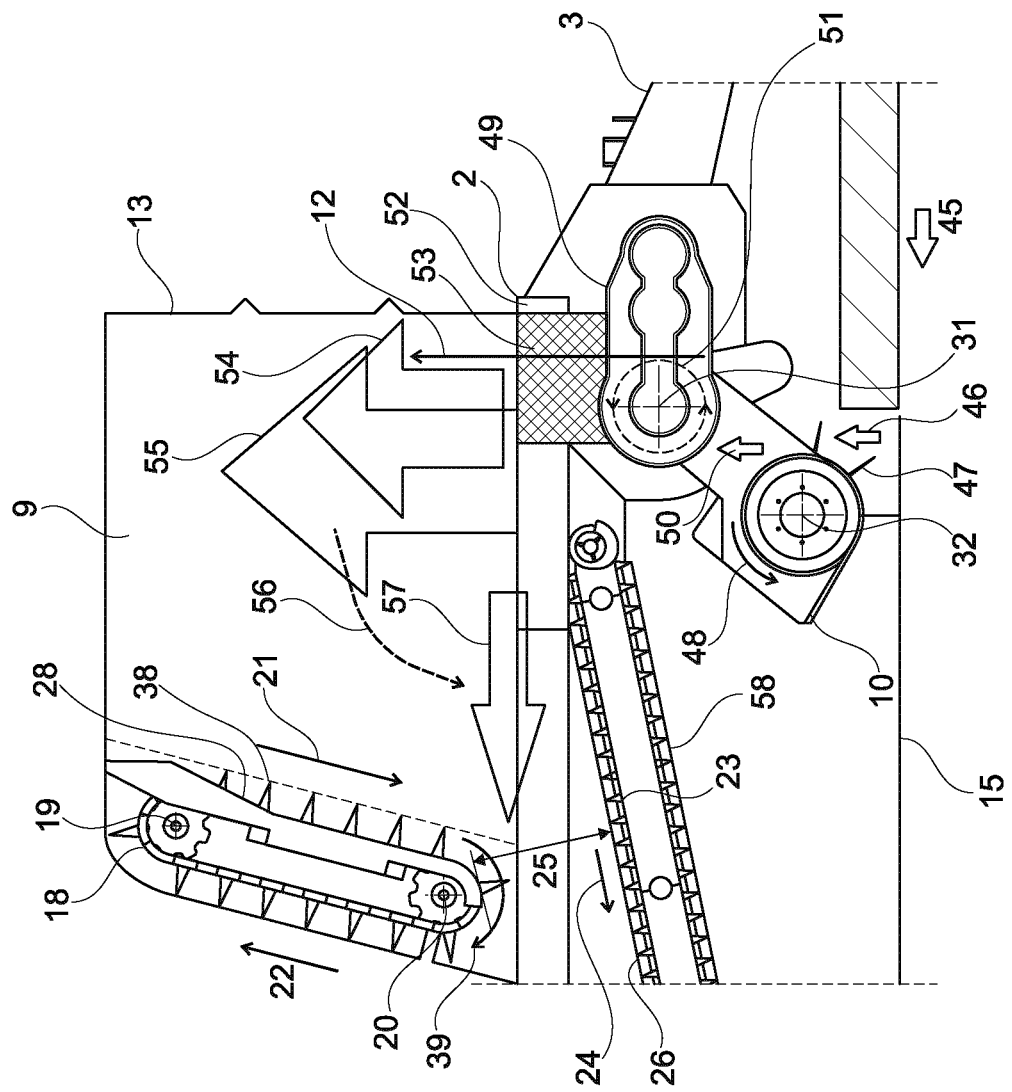
FIG. 4 is an expanded view of the accumulator operation of FIG. 3.

Once in the accumulator 9 forage 45 is constrained preferably only by the side walls 14 and forward wall 13 as the forage 45 rises, preferably, against gravity as is it driven upwards in direction 12 by the continuously driven input material as an input flow 54, 55 in FIG. 4 to form a reformed input body 54 in continuous upward moving turmoil. Lacking complete boundaries the inlet flow body 54 expands as it moves upwards and to the rear as at 55 while continuing its upward movement in turmoil or roiling. Unconstrained flow 54, 55 continuously tumbles and roils in both transverse directions to fill the accumulator transversely and from front to back as at 56 in FIG. 4. Unconstrained flow of forage provides a moving retained body of chopped forage within chamber 9, loaded from the front where the bulk of the input material remains in turmoil.

During the baler operation duty cycle live floor conveyor 16 transports the retained body of input forage across its full width rearwards in direction 24, and preferably downwards, as at 57, and in and through chamber exit slot 25 in conjunction with the downward and preferably rearward drive motion of toothed array 38 along direction 21. During the wrapping/ejection cycle conveyors 16 and 18 stop rearward and downward motion while input continues building up as a forward-loaded retained body which is denser towards the front of the chamber 9 and laterally spread to the side walls 14.

Live floor conveyor 23 may include a floor array of drive teeth 58 for increased traction of the input body material into the chamber exit slot 25 where it is raked into an uncompressed belt of chopped forward delivered further to the rear by conveyor extension 26. Raking is provided by a speed differential between the live floor transport speed provided to the input body during the baling cycle by the live floor conveyor and the throughput speed of the active rear wall apron 28 as the toothed array continuously rounds the bottom edge of apron 28 to the rear 39, both within chamber exit slot 25.

Most preferably, the wall apron throughput speed is higher than live floor conveyor speed. The speed differential can be as little as 10% to as much as 5 times or more. As an example, floor transport speed may be provided at 50-1000 inches per minute while upper conveyor provides a throughput speed of 2600 inches per minute, more or less thoroughly raking the input body into a downstream uncompressed and uniformly distributed belt of forage material.

Figure 5:
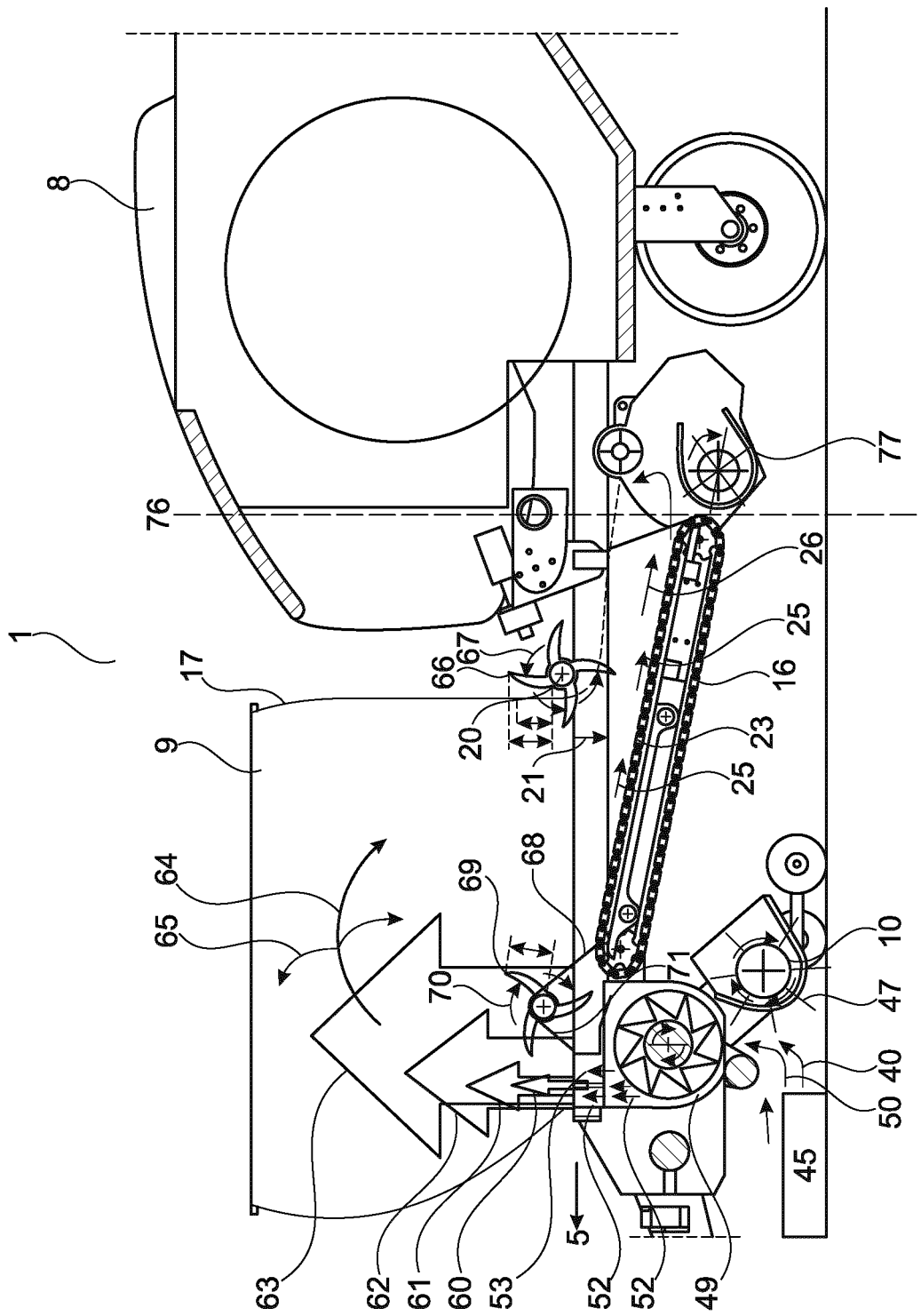
FIG. 5 is a port side elevation in section showing an alternative embodiment of the continuous round baler.

FIG. 5 shows an alternative embodiment. Lower axle 20 carries a rotary toothed star wheel array 66 extending transversely the full width of the live floor conveyor 16 for rotation counter-clockwise as at 67 so as to drive input forage material downward in direction 21 and through exit slot 25 during the baling duty cycle.

Chopper exit slot 52 is augmented by upstanding transverse weir 68 topped by a transverse rotary toothed star wheel array 69 above and preferably forward of conveyor 23. Star wheel array 69 is driven clockwise in conjunction with rearward motion of the live floor conveyor 23 and rear star wheel array 66 during the baling duty cycle, at least.

Weir 68 provides an exit slot expansion region 71 by the rearward slope of its forward surface as shown in FIG. 5.

Compressed chopper output 53 is continuously driven through chopper exit slot 52 and undergoes vertical and front to back decompression as an roiling input body in turmoil as at 60, 61, 62, 63 in FIG. 5. Tumbling to the rear as at 63 is initiated from the roiling action as is tumbling, decompression and roiling laterally as at 65 to fully transversely occupy the width of chamber 9, which is preferably wider than chopper exit slot 52.

Figure 6:
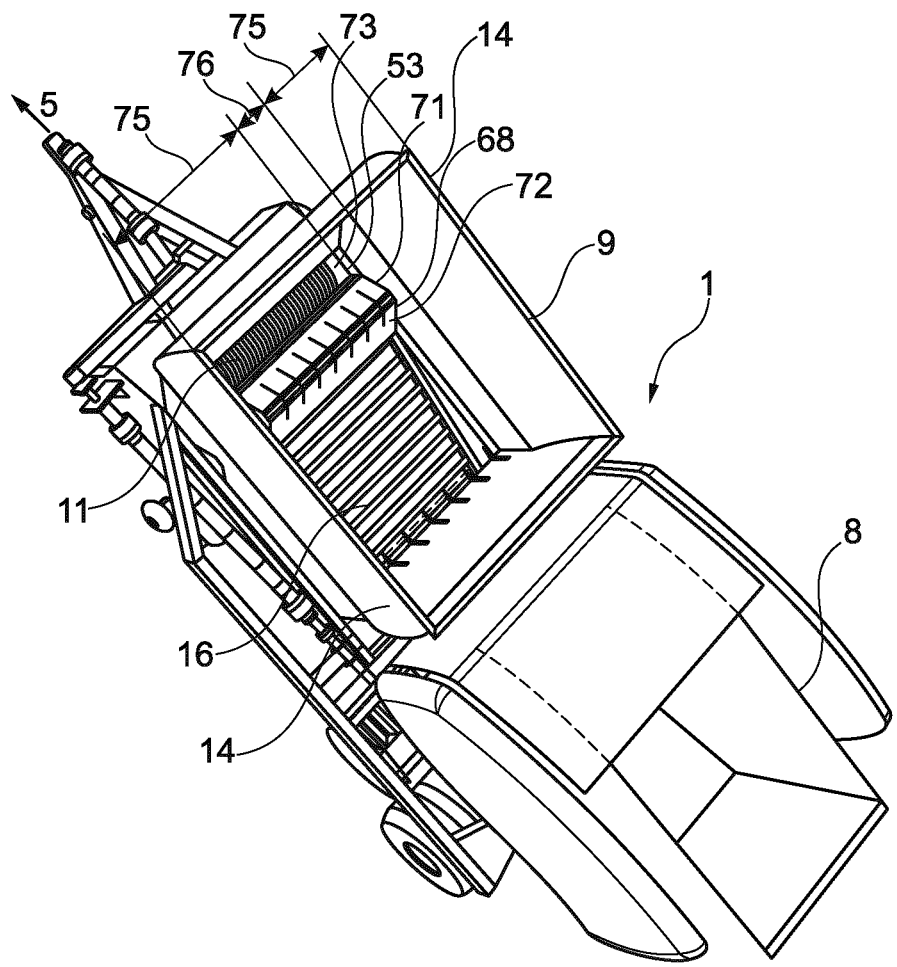
FIG. 6 is a partial top perspective view of the continuous round baler of FIG. 5.

In FIG. 6 weir 68 includes a transverse array of drive slots 72 adapted to accommodate the rotation of individual star wheels of array 66.

Preferably, as shown in FIG. 6 transverse rotary chopper 11 may not extend the full width of the chamber 9 as at expansion region 73 in chopper exit slot provided at each transverse end of chopper 11.

Further preferably, chamber side walls 14 include outwardly inclined areas 74 which increase the lateral dimension of the chamber beyond live floor conveyor 23 width 75 by extra width 76, and further, so that the all width sections of the chamber 75 are wider than the live floor conveyor 16 and, preferably, chamber exit slot 25.

Tumbling, expansion and roiling of the retained body spreads the retained body of forage in the chamber 9 laterally to both sides of the chamber as well as to the rear in both continuous round baler duty cycles, continuously.

As shown in FIG. 5 forage material is raked into rearward transport on conveyor extension 26 as a uniformly distributed (both laterally and in the direction of travel) uncompressed material. As material passes rearward and preferably downward of the conveyor extension 26 across boundary 76 is then continuously (during the baling duty cycle) picked up off the conveyor and extrusion 26 and passed along to the baler input in known manner with or without further narrowing by edge in lateral compression.

Figure 7:
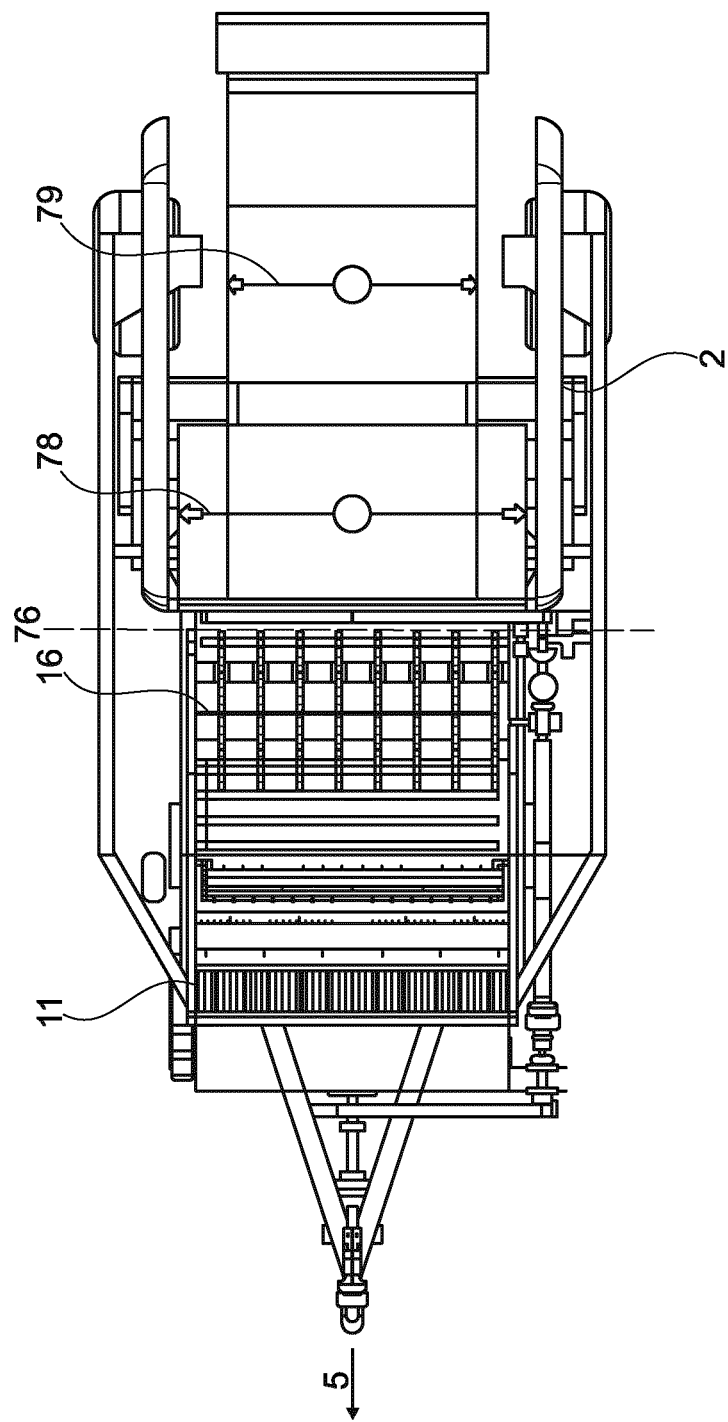
FIG. 7 is a bottom plan view of the continuous round baler.

As shown in bottom view FIG. 7 baler 2 may include an input rotor mechanism with a wider overall input width 78 which may include side augers and a main input rotor 77. In this view the uniformly distributed belt of input material is narrowed from its edges towards the center at the baler 2 entry to the bale with 79 forming a uniformly dense hard side wall round bale or square round bale.

Overall uncompressed windrows of harvested forage are continuously raked up, chopped and compressed, partially uncompressed in motion and laterally and rearwardly spread while forward in an accumulation chamber, raked through and in transverse exit slot, into a decompressed uniformly distributed state and delivered to an intermittently operating baler. In the wrapping/ejection duty cycle all input material is retained in a moving body in turmoil within the chamber, forwards the front. Upon commencement of the next baling duty cycle the retained body is transported and raked to the rear until the chamber empties or is limited to newly chopped material where upon the cycle repeats, continuously.

Figure 8:
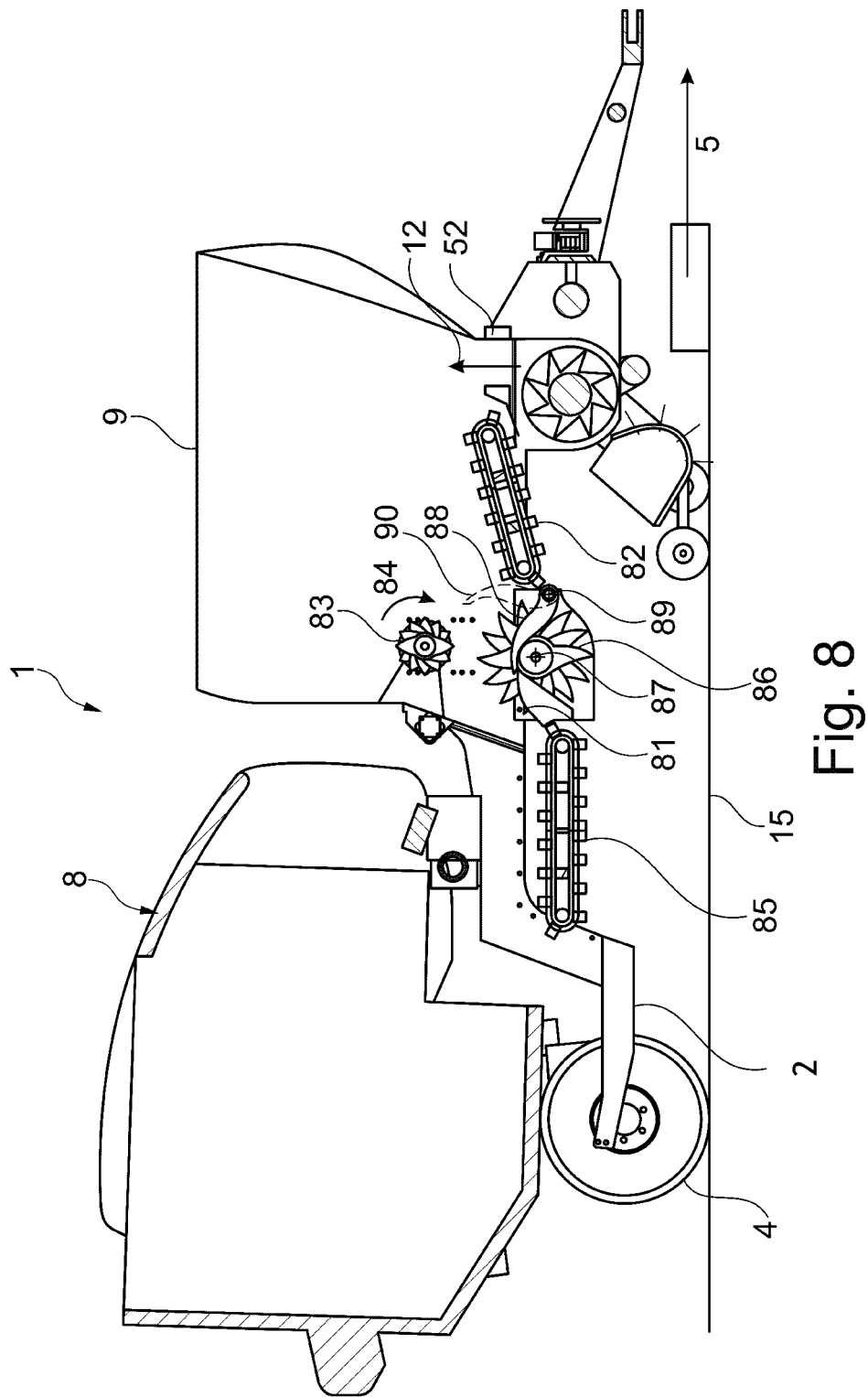
FIG. 8 is a longitudinal section of a further embodiment of the continuous round baler.

FIG. 8 is a longitudinal central sectional plan view of a further embodiment of the continuous round baler.

Lower floor conveyor 18 and conveyor extension 26 are split in to a preferably down-sloped fore section 82 and an aft extension section 85, the aft section of which may be horizontal, down-sloped or slightly up-sloped.

Figure 9:
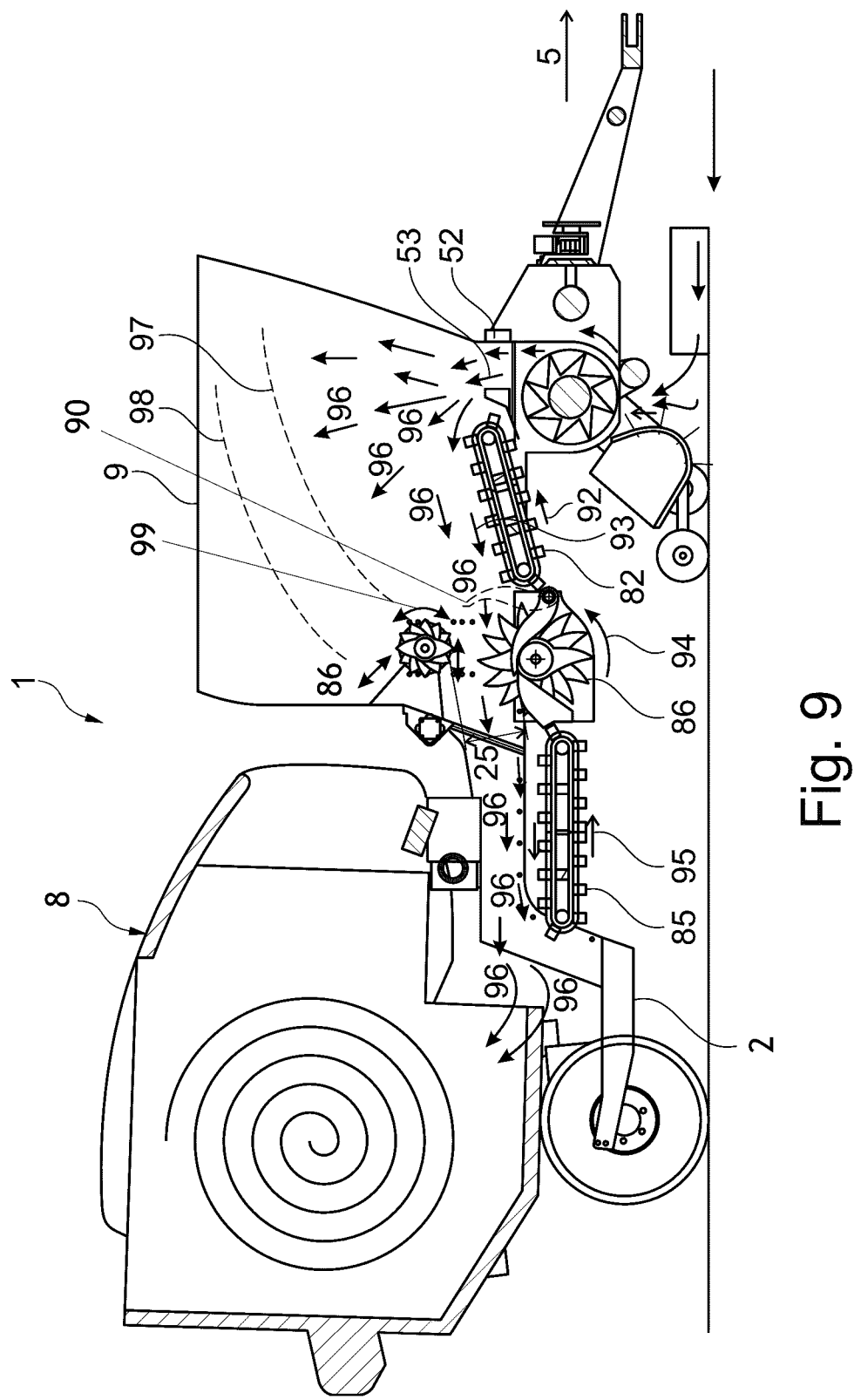
FIG. 9 is the section of FIG. 8 indicating the motion of moving parts and the incoming forage material.
Figure 10:
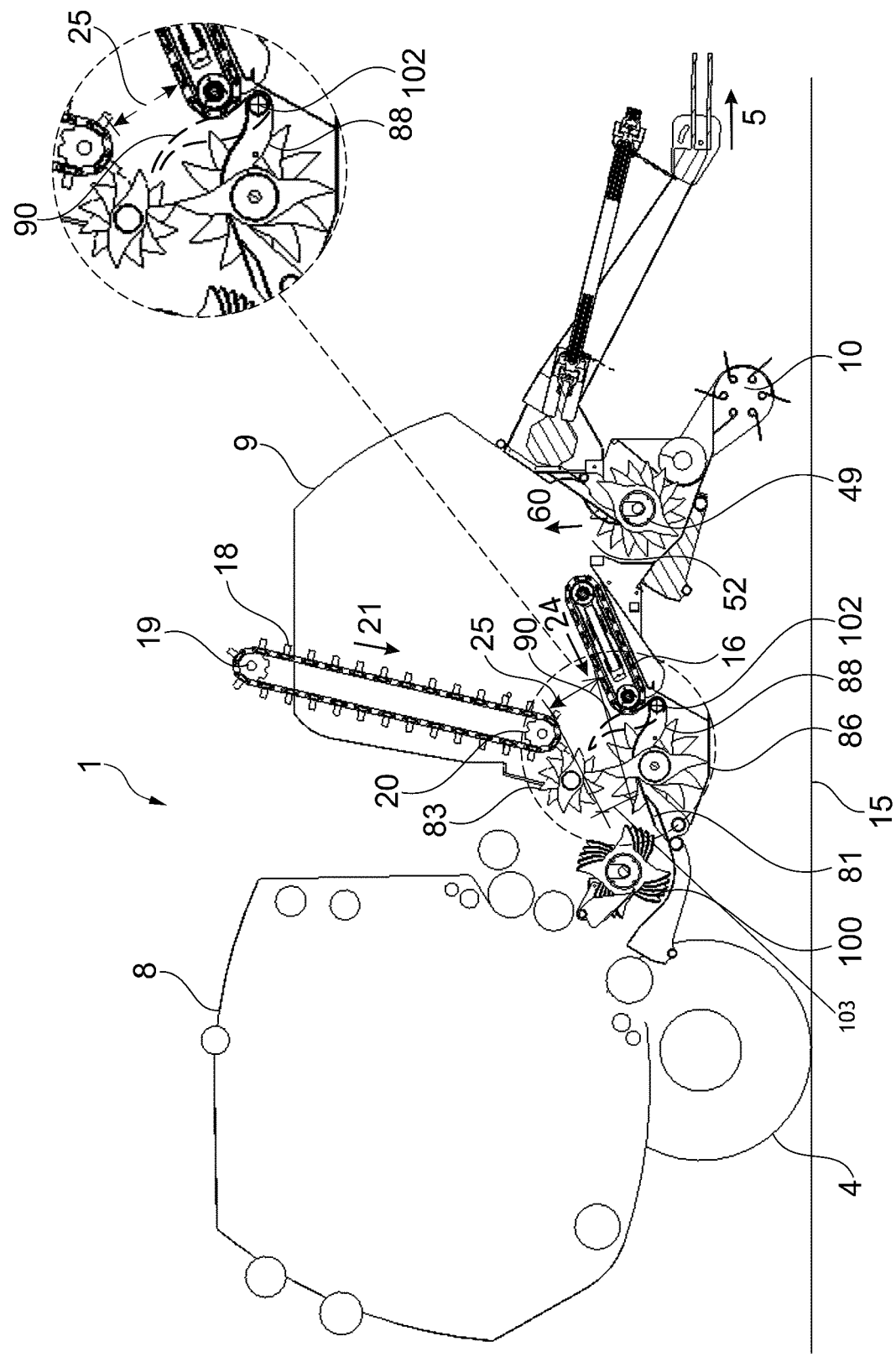
FIG. 10 is a sectional elevation of a further embodiment of the continuous round baler.

A lower transverse drive rotor 86 includes a horizontal array of rotating drive teeth and a gating fence with fence pickets aligned between the drive teeth separately rotatable between a retracted position as shown in FIG. 8 and a raised gating fence position 90 shown dotted outline in FIGS. 8 through 10.

During the baling duty cycle the retained body of forage material (including both accumulated input and new input) is driven through the exit slot 25 as by direction 84 by rotation or the upper rotor 83, the drive rotor 86 and the floor conveyor 82.

Upon passing the exit slot 25 the forage is separated from drive rotor 86 on to a sliding surface 81 intertwined between the rotor teeth for uniform rearward flow on the downstream conveyor extension.

During the wrapping/ejection duty cycle gating fence 90 is disengaged from the rotating teeth of drive rotor 86 by rotation about an transverse axis 89 in to a forage flow blocking condition at which point rotation of upper rotor 83 and floor conveyor 82 cease rearward and drive motion.

FIG. 9 includes a motion field 96 indicating a typical direction of forage flow during the baling cycle.

Upon entry into the wrapping/ejection cycle, gating fence is raised as at 90, the upper rotor 86 and the floor conveyor 82 cease their rearward driving motion, preferably stopped, and the accumulation chamber 9 begins and continues to fill with a retained body of forage as at 97. As the wrapping/ejection cycle continues to its limit chamber 9 continues to fill with the moving retained body as at 98 until the end of that duty cycle.

Upon the commencement of the baling cycle, gating fence 90 is lowered by rotation of its fence teeth counter-clockwise thereby exposing the rotating teeth of rotor 86, rotor 83 and floor conveyor 82 are started and the retained body is uniformly driven through exit slot 25.

Figure 11:
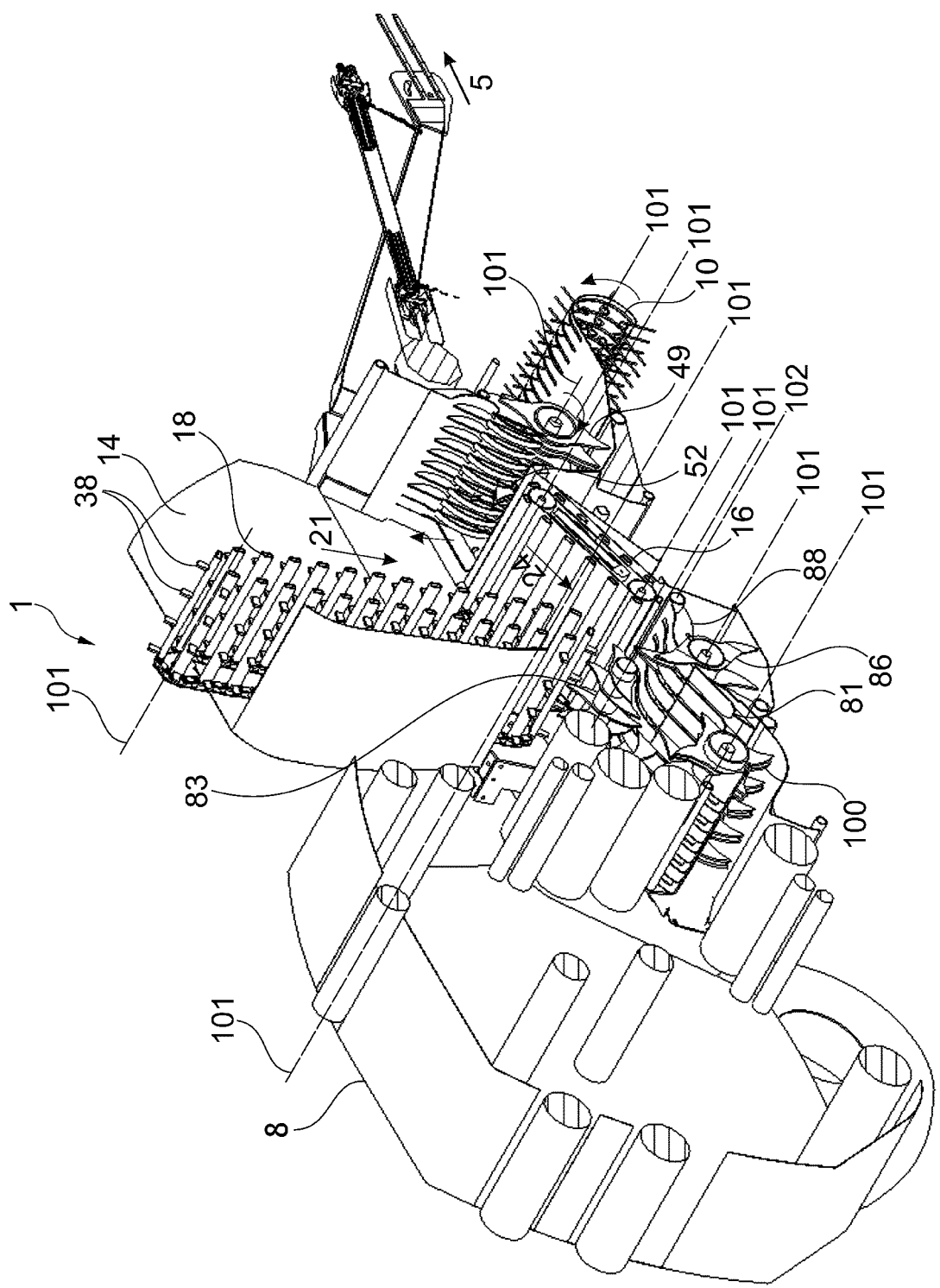
FIG. 11 is a perspective interior view of the continuous round baler of FIG. 10.

FIG. 11 shows a still further and preferred embodiment including both an upper rotor 83 and an upper toothed conveyor 18, both driven in a clockwise direction during the baling duty cycle. Rotor 83 is spaced to the rear of toothed conveyor 18 and slightly closer to rotor 86 and floor conveyor 16 to form a drive nip within exit slot 25 to positively drive the forage material rearward along both its top and bottom edges through the exit slot 25, the nip and decompress it in to downstream flow.

The scope of the present disclosure is by way of example rather than by way of limitation, and the subject disclosure does not preclude inclusion of such modifications, variations, and/or additions to the present subject matter as would be readily apparent to a person skilled in the art.

LIST OF DRAWINGS ELEMENTS 1 continuous round baler
2 frame
3 drawbar
4 support wheels
5 motion direction
6 tractor hitch connection
7 main continuous round baler drive
8 round baler
9 accumulator
10 rotary pickup
11 rotary chopper
12 upward input direction
13 accumulator forward wall
14 accumulator side wall
15 field level
16 live conveying floor
17 accumulator rearward wall
18 upper toothed conveyor
19 upper conveyor axis/axle
20 lower conveyor axis/axle
21 upper conveyor downward direction
22 upward conveyor idler direction
23 live floor conveyor
24 live floor direction
25 accumulator chamber exit slot
26 rearward extension of live floor conveyor
27 toothed drive
28 active rear wall apron
30 upper axle hydraulic drive
31 chopper axis of rotation
32 pickup axis of rotation
33 PTO rotation axis
34 power drive belt
35 side-drive axle
36 powered rotation
37 rear drive belt
38 toothed array
39 toothed array rounds bottom edge of apron 28
45 windrow aligned in direction of travel
46 windrow pickup 47 pickup rotary tynes
48 pickup direction of rotation
49 rotary chopper
50 forage from pickup to chopper input
51 chopper direction of rotation
52 chopper transverse exit slot
53 compressed chopper exit forage
54 rising compressed input forage
55 rising and expanding/tumbling/roiling input forage
56 rearward tumbling
57 rearward transport
58 floor conveyor toothed array
60-63 expansion of compressed input material upwards, laterally and to the rear
64 tumbling to the rear/roiling
65 lateral tumbling/roiling
66 toothed star wheel array
67 rotation counter-clockwise
68 upstanding transverse weir
69 forward star wheel array
70 rotation clockwise
71 expansion wall
72 drive teeth slots
73 chopper exit expansion
74 outwardly inclined side walls
75 live floor conveyor width
76 rear floor extension boundary
77 baler input rotor mechanism
78 baler input width
79 bale width
81 sliding separation surface
82 down-slope conveyor surface
83 upper rotary rake
84 direction of rotation, clearance by opposite rotation
85 downstream conveyor extension
86 lower rotary rake
87 transverse axis of rotation
88 gate fence teeth between rotor blades—show during baler duty cycle
89 gate fence axis of rotation
90 gate fence teeth rotated in flow blocking condition during wrapping/ejection duty cycle
92 floor conveyor idler surface
93 floor conveyor drive surface
94 lower rotor direction of rotation, preferably continuous rotating
95 floor conveyor extension idler direction
96 forage flow filed pattern in longitudinal section in the direct of travel
97 retained body upper limit during formation (filling) and during baling duty cycle (discharging)
98 retained body upper limit at commencement of baling cycle
99 reversing direction of upper rotor for clearance of bound up material
100 baler input rotor acting as transport plus baler input
101 axes of rotation parallel
102 gating fence axis of rotation, item 89 in FIG. 8
103 drive nip

The invention claimed is:

1. A continuous round forage baler including:
   (a) a baling duty cycle,
   (b) a wrapping/ejection duty cycle,
   (c) a continuously operating transverse rotary pickup,
   (d) a continuously operating rotary chopper structured to provide a continuous stream of chopped compressed forage into an accumulation chamber,
   (e) the accumulation chamber including a forward portion, a bottom, opposed side walls, a rearward wall and a down-sloped active floor comprising a floor conveyor, the accumulation chamber structured to contain the continuous stream of chopped compressed forage and retain the continuous stream during both the baling duty cycle and the wrapping/ejection duty cycle,
   (f) a transverse chopper exit slot between the rotary chopper and the chamber bottom structured to deliver the continuous stream of chopped compressed forage upward into the forward portion of the accumulation chamber against a back pressure,
   (g) a transverse rotary rake adjacent the rearward wall of the accumulation chamber,
   (h) a single transverse exit slot between the floor conveyor and the transverse rotary rake,
   (i) a rotary drive structured to drive the floor conveyor and the rotary rake together during the baling duty cycle at differential throughput speeds between a surface throughput speed of the floor conveyor and a rotary throughput speed of the rotary rake, and
   (j) a downstream conveying surface structured to support raked and decompressed forage material in transport from the single transverse exit slot rearward to a baler.

2. The continuous round forage baler as claimed in claim 1 including alternating multiple duty cycles; the accumulation chamber configured to accumulate the chopped compressed forage during each wrapping/ejection duty cycle as a retained body and and to discharge the retained body at the end of each wrapping/ejection duty cycle.

3. The continuous round forage baler as claimed in claim 1 wherein at least one of the chopper exit slot and the single transverse exit slot are letterbox shaped and extend across a width of the floor conveyor.

4. The continuous round forage baler as claimed in claim 1 wherein the opposed side walls are spaced farther apart than a width of the conveyor.

5. The continuous round forage baler as claimed in claim 2 wherein at least one of the retained body is narrowed by laterally spaced restraints as the chopped compresses forage is moved rearward on the floor conveyor or the decompressed forage material is moved along the downstream conveying surface.

6. The continuous round forage baler as claimed in claim 1 wherein the floor conveyor is structured for no rearward motion during the wrapping/ejection duty cycle.

7. The continuous round forage baler as claimed in claim 1 wherein the floor conveyor is structured to stop during the wrapping/ejection duty cycle.

8. The continuous round forage baler as claimed in claim 1 wherein the transverse rotary rake is structured to drive the chopped compressed forage both downward and to the rear through the single transverse exit slot.

9. The continuous round forage baler as claimed in claim 1 wherein the differential throughput speeds are plus or minus 10%, 20%, 30% or 40%.

10. The continuous round forage baler as claimed in claim 1 wherein the rotary rake is structured to operate at a higher throughput speed than the speed of the surface of the floor conveyor.

11. The continuous round forage baler as claimed in claim 1 wherein the floor conveyor is structured to allow for forwardly directed slippage between a body of retained material and the speed of the surface of the floor conveyor.

12. The continuous round forage baler as claimed in claim 1 wherein the floor conveyor includes an in-chamber conveyor section, a transversely disposed lower rotary rake forming the lower extremity of the chamber exit slot and a downstream conveyor section.

13. The continuous round forage baler as claimed in claim 12 wherein the lower rotary rake includes a rotary gating fence structured to rotate into a closed-gate position during the wrapping/ejection duty cycle.

14. The continuous round forage baler as claimed in claim 13 wherein the rotary gating fence is structured to rotate about the an axis parallel to the axis of the lower rotary rake.

15. The continuous round forage baler as claimed in claim 12 further comprising a transverse separation surface structured to decompress raked forage as it is separated from the lower rotary and driven onto a downstream conveyor.

16. The continuous round forage baler as claimed in claim 12 wherein the lower rotary rake operates at a higher throughput speed than the speed of the surface of the conveyor.

17. The continuous round forage baler as claimed in claim 12 wherein the lower rotary rake is structured to operate at a differential throughput speed higher than the upper rotary rate throughput speed or the floor conveyor surface speed, or both.

* * * * *